United States Patent [19]

Hwang

[11] Patent Number: 5,383,209
[45] Date of Patent: Jan. 17, 1995

[54] SECOND HARMONIC GENERATOR

[75] Inventor: Myeong-mo Hwang, Seoul, Rep. of Korea

[73] Assignee: Samsung Electronics Co., Ltd., Kyungki, Rep. of Korea

[21] Appl. No.: 150,299

[22] Filed: Nov. 12, 1993

[30] Foreign Application Priority Data

Nov. 25, 1992 [KR] Rep. of Korea ............... 92-22330

[51] Int. Cl.⁶ .................................................. H01S 3/04
[52] U.S. Cl. ........................................ 372/34; 372/29; 372/105; 372/22; 372/21
[58] Field of Search ................. 372/21, 34, 29, 105, 372/22

[56] References Cited

U.S. PATENT DOCUMENTS

| | | | |
|---|---|---|---|
| 4,260,957 | 4/1981 | Congleton et al. | 307/425 |
| 5,093,832 | 3/1992 | Bethune et al. | 372/21 |
| 5,168,503 | 12/1992 | Maeda | 372/22 |
| 5,265,110 | 11/1993 | Naza | 372/21 |
| 5,315,433 | 5/1994 | Okazaki et al. | 372/21 |

*Primary Examiner*—Léon Scott, Jr.
*Attorney, Agent, or Firm*—Lowe, Price, LeBlanc & Becker

[57] ABSTRACT

A second harmonic generator (SHG) for generating second harmonics from a non-linear bifringent crystalline material of a resonator utilizes a brewster plate within the laser cavity instead of a conventional beam splitter, and part of split second harmonics is used for controlling the temperature of the non-linear bifringent crystalline material. Thus, due to the elimination of the conventional beam splitter, the overall size of a manufactured SHG module can be reduced by about 20%, and the utilization of nearly 100% of the generated harmonics is made possible without any loss in the beam splitter. Further, since the beam splitter is eliminated, beam loss and beam quality deterioration due to beam interference within the conventional beam splitter may be avoided.

5 Claims, 2 Drawing Sheets

SECOND HARMONIC GENERATOR

BACKGROUND OF THE INVENTION

The present invention relates to a second harmonic generator for generating second harmonics from non-linear bifringent crystalline material of a resonator, and more particularly, to a second harmonic generator for attaining high-performance and enabling miniaturization by utilizing part of a generated second harmonic power to control the temperature of the non-linear bifringent crystalline material.

In general, a resonating beam is generated by means of a pair of mirrors located within a laser cavity, in order to improve the efficiency of a second harmonic generation.

A resonating beam structure is disclosed in U.S. Pat. No. 5,093,832. As shown in FIG. 1, the optical path of a reflected beam is split from the travelling path of an incident beam from a laser diode 12, within an optical resonator 20 having a pair of mirrors 22 and 26 provided at the respective ends thereof. Part of the output beam is deflected by a beam splitter 54, detected by a photo-detector 60 and fed back to peltier elements 80 through a temperature controller 70. However, in such a structure, since only about 90% of output beams is used for pick-up, the efficiency of beam utilization is relatively low. Also, using such a structure makes it difficult to miniaturize an SHG module since a feedback circuit having the photo-detector 60, differential amplifier 66, temperature controller 70, etc. is separately installed outside optical resonator 20. Moreover, beam quality may be lowered due to a mutual interference of the incident beams and reflected beams within beam splitter 54.

Also, U.S. Pat. No. 4,260,957, as shown in FIG. 2, discloses a method for extracting beams travelling reversely, among SHG beams bi-directionally generated from a non-linear bifringent crystalline material, potassium titanyl phosphate (KTP), for external transmission. In other words, in order to extract 100% of the reverse beam, another brewster plate 22 is applied, in addition to brewster plate 20. The angle of the plates is said to be the brewster angle against the fundamental frequency and is set to minimize the plates' interference with the fundamental frequency. However, since a separate brewster plate is additionally installed, the cost may be increased and the miniaturization of the SHG module is also difficult.

SUMMARY OF THE INVENTION

It is an object of the present invention to provide an SHG by which the miniaturization of a module is made easy and a high-quality beam can be formed.

To accomplish the above object, an SHG according to the present invention comprises: a pair of mirrors tier establishing a laser resonating zone; an pumping beam source for supplying all pumping beam to the resonating zone; an active laser rod for generating a resonant beam having a predetermined fundamental frequency in the laser resonating zone, by means of the pumping beam; a frequency converting element for generating second harmonics from the fundamental wave of the resonant beam, in the laser resonating zone; a temperature detecting element for detecting the temperature of the frequency converting element: a brewster plate placed between the active laser rod on the beam path of the resonating zone and the frequency converting element; a filtering unit provided along the path of the split-reflected beam from the brewster plate for selectively passing only the harmonic beam component among the split-reflected beam; a beam-to-current converting element for converting to output the filtered beam from the filtering unit into current; a controlling unit for generating the controlled current according to the frequency converting element temperature acquired by means of the temperature detecting element, after receiving the output from the beam-to-current converting element; and a current-to-heat converting element for converting the current input from the controlling unit into heat.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
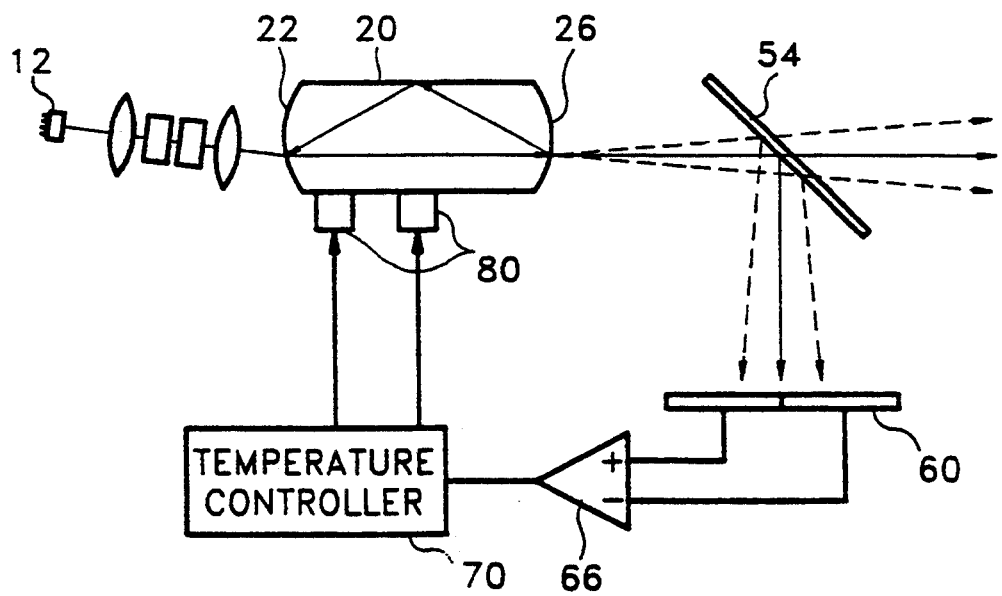
FIG. 1 is a schematic diagram of a conventional second harmonic generator.
Figure 2:
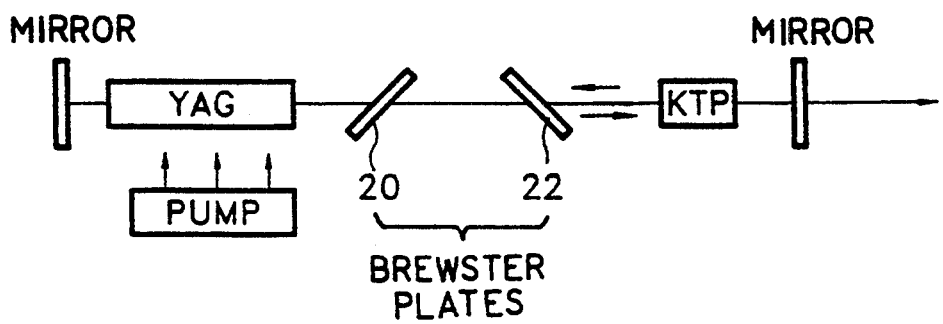
FIG.2 is a schematic diagram of another conventional second harmonic generator.
Figure 3:
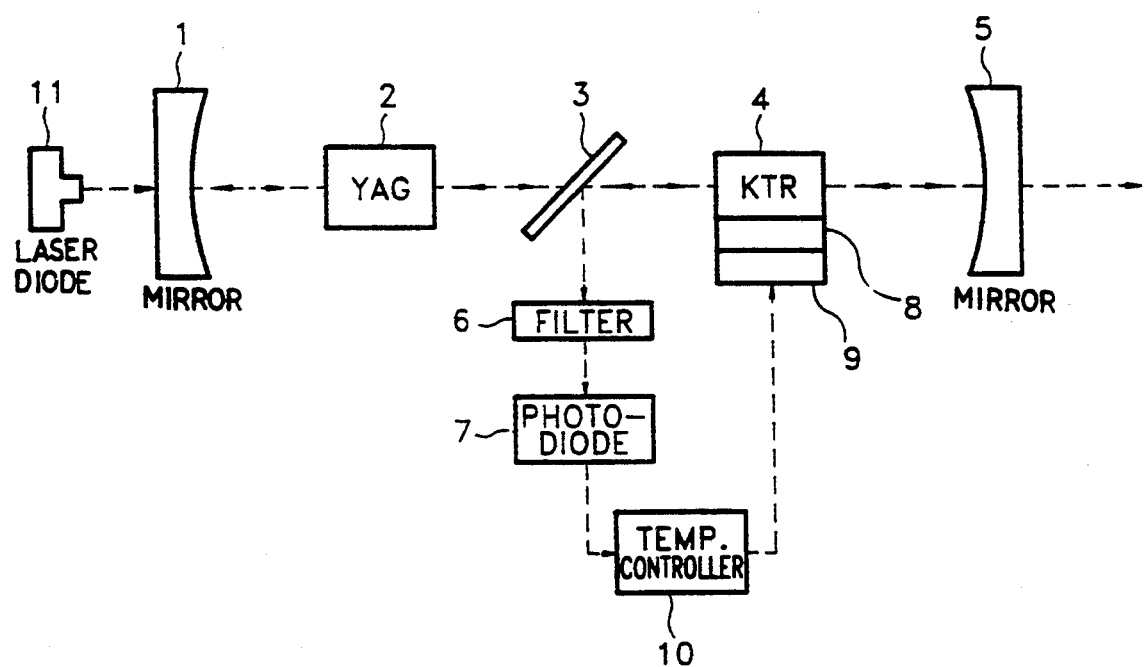
FIG.3 is a schematic diagram of a second harmonic generator according to the present invention.

In a second harmonic generator (SHG) according to the present invention, as illustrated in FIG. 3, an active laser rod 2, a brewster plate means 3 and a non-linear bifringent crystalline material 4 are provided in sequence between two mirrors 1 and 5 which are spaced at a predetermined interval. A filter 6 for passing only harmonics split from the brewster plate means 3 and photo-diode 7 for detecting the filtered beam and converting it into current, are provided beneath the brewster plate means 3. A temperature controller 10 which provides a feedback signals to a peltier element 9 and a thermistor 8 installed in the non-linear bifringent crystalline material 4 are connected to the photo-diode 7 sequentially. In the SHG having the above structure, yetrium-aluminum-garnet (Nd: YAG) can be employed as the active laser rod 2, KTP can be employed as the non-linear bifringent crystalline material 4, a laser diode can be employed as the pumping beam source 11 and a material filtering the 532 nm wave length of the beam can be employed as the filter 6.

In the operation of such a SHG according to the present invention, when the 809 nm beam from laser diode 11 passes through mirror 1, first, and becomes incident to active laser rod 2 (Nd: YAG), a laser beam of 1064 nm is generated. If the laser beam passes through brewster plate means 3 and then non-linear bifringent crystalline material 4 (the KTP), second harmonic beam of 532 nm is generated. The second harmonics generated in the above manner are transmitted externally through mirror 5, and the fundamental wave of 1064nm is reflected from mirror 5 to be incident upon KTP 4 again. At this time, another second harmonic beam of 532 nm is generated.

After part of the generated second harmonics (about 10%) is reflected from brewster plate means 3 and passed through filter 6, which passes only that portion of the beam at 532nm, the filtered beam is converted into current by photo-diode 7 to be applied to temperature controller 10. The monitoring signal of the SHG output transferred to the temperature controller 10 and the temperature signal of KTP detected by means of thermistor arc controlled by the temperature controller 10 and the controlled signals are converted into heat by supplying a predetermined current to peltier element 9, thereby resulting in the stabilization of a high-performance output.

Meanwhile, the fundamental wave of 1064 nm reversely incident upon brewster plate means 3 passes through brewster plate means 3 and Nd: YAG 2 to be reflected by mirror 1 and then involves in generating second harmonics of the normal direction again. That is to say, in the SHG according to the present invention, 100% of the fundamental frequency component of P wave passes through brewster plate. However, since, in the reverse direction, the SHG polarization due to the fundamental frequency component of P wave is directed to 45° toward P wave, about 20% of reverse SHG beam component is reflected on the brewster plate and the remaining 80% which passes through the brewster plates to reach the Nd: YAG is exhausted.

The present invention which utilizes a brewster plate within the laser cavity as a beam splitter instead of a conventional beam splitter reduces the cost of the apparatus by eliminating the conventional beam splitter. Also, the overall size of a manufactured SHG module call be decreased, and nearly 100% of the generated harmonics is available without any loss in the beam splitter. Further, since beam splitter is eliminated, beam loss and beam quality deterioration due to beam interference within the conventional beam splitter may be avoided.

What is claimed is:

1. A second harmonic generator comprising:
   a pair of mirrors for establishing a laser resonating zone;
   a pumping beam source for supplying a pumping beam to said resonating zone;
   an active laser rod for generating a resonant beam having a predetermined fundamental frequency in said laser resonating zone, by means of said pumping beam;
   a non-linear frequency converting element responsive to said resonant beam for generating a second harmonic beam at a second harmonic frequency of said resonant beam in said laser resonating zone;
   a temperature detecting element coupled to said non-linear frequency converting element for detecting the temperature of said frequency converting element;
   a brewster plate means placed between said active laser rod on the beam path of said resonating zone and said non-linear frequency converting element for reflecting a split portion of said second harmonic beam;
   a filtering unit provided along the path of said split portion reflected from said brewster plate means for selectively passing only a harmonic beam component of said split portion;
   a beam-to-current converting element responsive to said filtering unit for converting said harmonic beam component into current;
   a controlling unit responsive to said beam-to-current converting element and to said temperature detecting element for generating control current; and
   a current-to-heat converting element coupled to said non-linear frequency converting element and responsive to said control current from said controlling unit for controlling the temperature of said non-linear frequency converting element.

2. The generator of claim 1, wherein said non-linear frequency converting element comprises non-linear bifringent crystalline material.

3. The generator of claim 1, wherein said temperature detecting element comprises a thermistor.

4. The generator of claim 1, wherein said beam-to-current converting element comprises a photodiode.

5. The generator of claim 1, wherein said current-to-heat converting element comprises a peltier element.

* * * * *